(12) United States Patent
Guerreiro

(10) Patent No.: US 8,234,785 B2
(45) Date of Patent: Aug. 7, 2012

(54) METHOD FOR PRODUCING A CONNECTING ROD

(75) Inventor: Stefano Sergio Guerreiro, Sorocaba-SP (BR)

(73) Assignee: ThyssenKrupp Technologies AG, Essen (DE)

(*) Notice: Subject to any disclaimer, the term of this patent is extended or adjusted under 35 U.S.C. 154(b) by 815 days.

(21) Appl. No.: 12/440,827

(22) PCT Filed: Sep. 5, 2007

(86) PCT No.: PCT/EP2007/007740
§ 371 (c)(1),
(2), (4) Date: Mar. 11, 2009

(87) PCT Pub. No.: WO2008/031522
PCT Pub. Date: Mar. 20, 2008

(65) Prior Publication Data
US 2010/0050432 A1 Mar. 4, 2010

(30) Foreign Application Priority Data
Sep. 15, 2006 (EP) .................................... 06019412

(51) Int. Cl.
*B21D 53/84* (2006.01)

(52) U.S. Cl. ............... 29/888.09; 29/898.12; 29/898.13; 427/236; 427/448

(58) Field of Classification Search ............... 29/888.09, 29/888.091, 888.092, 888.08, 898.12, 898.13, 29/423, 424, 530; 427/236, 448, 421.1, 446
See application file for complete search history.

(56) References Cited

U.S. PATENT DOCUMENTS
2,588,421 A * 3/1952 Shepard ..................... 427/404
(Continued)

FOREIGN PATENT DOCUMENTS
DE 38 06 236 C1 8/1989
(Continued)

OTHER PUBLICATIONS
Machine Translation of DE 10035032 A1; Author: Claus Juergen; Feb. 7, 2002.*

(Continued)

*Primary Examiner* — David Bryant
*Assistant Examiner* — Ryan J Walters
(74) *Attorney, Agent, or Firm* — Crowell & Moring LLP

(57) ABSTRACT

The invention relates to a method for producing a bearing component (1), in particular a connecting rod (1), from a molded part (2), wherein the bearing component (1) includes at least one divided bearing seat (5) formed by a bearing base (3) and a bearing cover (4), and a bearing seat surface (7) coated with a bearing layer (6) of a bearing layer material is formed in the bearing seat (5) for supporting a shaft. In the method of the present invention the bearing cover (4) is separated from the molded part (2) along a separating surface (8). In accordance with the invention, a masking agent (M) is disposed perpendicularly with respect to a separating line (10) on the bearing seat surface (7) during a coating process for applying the bearing layer (6) in order to form a coating-free region, such that a recess (9) at a predetermined width (B) is produced in the bearing layer (6). The masking agent (M) is formed as an element which is separate from the bearing component (1) and is not connected thereto. The invention also relates to a device for carrying out an efficient and cost-effective production method for coated bearing components.

13 Claims, 7 Drawing Sheets

U.S. PATENT DOCUMENTS

| | | | |
|---|---|---|---|
| 5,551,782 | A | 9/1996 | Arnhold et al. |
| 6,560,869 | B1 | 5/2003 | Schlegel et al. |
| 7,743,746 | B2 * | 6/2010 | Maier et al. ............ 123/197.4 |
| 2009/0078080 | A1 * | 3/2009 | Kemnitz et al. ............ 74/579 E |

FOREIGN PATENT DOCUMENTS

| | | |
|---|---|---|
| DE | 43 03 592 A1 | 8/1994 |
| DE | 197 31 625 A1 | 9/1998 |
| DE | 100 35 032 A1 | 2/2002 |
| EP | 0 635 104 B1 | 1/1995 |
| WO | WO 00/37706 A1 | 6/2000 |

OTHER PUBLICATIONS

Human Translation of "Written Decision of the International Search Authority for PCT/EP2007/07740" May 9, 2007.*

International Search Report including English translation dated Jan. 18, 2008 and PCT\ISA\237 Form (Fifteen (15) pages).

* cited by examiner

METHOD FOR PRODUCING A CONNECTING ROD

The invention relates to a method for producing a bearing component, in particular a connecting rod, from a moulded part, as well as to a device in accordance with the preamble of the independent Claim of the respective type.

Such bearing components are known for example as connecting rods having a small connecting rod eye, a shaft and a large connecting rod eye, wherein the large connecting rod eye generally includes a divided bearing seat for supporting the connecting rod on a crankshaft. Such connecting rods are installed in large numbers e.g., in reciprocating-piston internal combustion engines for passenger vehicles and heavy goods vehicles, but also in engines for ships or in other engines. Of course, connecting rods can also be used in other machines in which linear motion has to be converted into rotary motion, or vice-versa. Corresponding machines can be e.g., reciprocating piston compressors, pumps, weaving machines and a multitude of other machines or technical devices.

Even though reference will more frequently be made hereinafter to a connecting rod as a preferred exemplified embodiment, it will of course be understood that the invention also relates to other bearing components which have a divided bearing seat as an essential feature.

A connecting rod or similar bearing components are generally produced by first providing a moulded part by forging, casting or by means of a powder-metallurgical method, wherein the internal dimension of the large connecting rod eye is preferably oversized in the region of a future separating point at which the large connecting rod eye is separated in a subsequent method step at a separating surface to form a divided bearing seat.

Separation to form the divided bearing seat can be effected for example by sawing, whereby the oversized dimensioning is then substantially eliminated. The separating surfaces of the thus formed connecting rod cap or bearing cover on the one hand and of the rest of the connecting rod on the other hand are processed in a precise manner in a further method step, e.g., by grinding. The connecting rod cap is, in the finalised state, generally attached to the rest of the connecting rod by means of connecting rod screws, wherein the screw holes required for this purpose can be bored before or after the separation. When the connecting rod is assembled, the bearing seat is then mechanically processed in order to receive bearing shells which are disposed between the connecting rod and the crankshaft, thus forming a sliding bearing.

The mechanical processing of the bearing seat mostly includes rough processing, fine processing and super-finishing by means of turning, precision turning or honing. Furthermore, recesses have to be provided in the bearing seat of the connecting rod eye which co-operate with corresponding lugs on the bearing shell halves so that twisting of the bearing shells in the operating state is obviated.

The two bearing shell halves have to be processed with a great deal of precision since on the one hand the inner surfaces of the bearing shell halves together with the crankshaft form the sliding bearing having a sliding bearing fit required for this purpose, and on the other hand the outer surfaces of the bearing shells have to be adapted to the bearing seat of the large connecting rod eye of the connecting rod. In order to ensure that the bearing shell halves are securely seated, it is necessary to clamp the bearing shell halves between the connecting rod cap, i.e., the bearing cover, and the rest of the connecting rod. As a result, it cannot be discounted that when screwing the connecting rod cap, warping occurs which can cause deformations which lead to fitting inaccuracies.

However, even with highly-precise processing, it cannot always be ensured that the connecting rod cap is not displaced in the case of large loads in the operating state and thus it can no longer be ensured that the bearing shell halves are correctly seated.

All of these problems, which occur when using bearing shells, were quickly recognised, in addition to the fact that the construction using bearing shells is costly and requires a great deal of maintenance especially because the bearing shells only have a limited service life, and various measures have been proposed in the Prior Art to at least partly overcome these problems.

Thus, a connecting rod is known from DE 38 06 236 whose connecting rod cap is separated from the rest of the connecting rod by means of break-separation, in other words, the connecting rod cap, i.e., the bearing cover, is not separated by means of sawing.

By virtue of the break-separation, a separating surface having a large, irregular and coarse surface is produced so that lateral displacement of the connecting rod cap from the rest of the connecting rod is substantially precluded.

A further positive effect is that the separating surface contains a unique break-surface by virtue of the break-separation so that the mixing-up of individual parts during assembly or repair work on the connecting rod is also precluded.

However, these connecting rods must still be provided with bearing shells, which means that although the problem of displacement of the connecting rod cap with respect to the rest of the connecting rod has been solved to some degree, all of the disadvantages of bearing shells described in detail above are still present.

In order to solve this set of problems, EP 0 635 104 proposes to completely dispense with the bearing shells in the bearing seat and instead provide the bearing seat surface with a thermal spray coating, i.e., with a surface layer as a bearing layer. The connecting rod cap is likewise separated from the rest of the connecting rod by means of break-separation so that in this case the connecting rod cap is also securely seated on the rest of the connecting rod.

A core idea in EP 0 635 104 is that the bearing layer is also divided by a break-separation so that the bearing layers of the two bearing parts, i.e., the bearing layer on the bearing cover and the bearing layer on the bearing base which forms the counterpart to the bearing cover, i.e., to the connecting rod cap, on the rest of the connecting rod in order to form the bearing seat, also uniquely fit together in a non-interchangeable manner.

However, it has been shown that the break-separation of the bearing layer actually causes more problems than it solves. In the case of break-separation of the bearing layer, undesired stresses, e.g., by plastic deformation, can occur in the bearing layer, regardless of the material which the bearing layer consists of, the thickness of the layer, etc.; depending upon the material or the strength of the induced stresses in the coating material, in serious cases cracks can even occur in the bearing layer, or the adhesion of the bearing layer on the bearing seat surface can weaken, wherein the bearing layer can even become detached from the bearing seat surface, above all in direct proximity to the break point. Furthermore, eruptions can occur on the inner edge of the bearing layer in the region of the break point so that the running surface, on which the crankshaft for example is supported and on which a surface of the crankshaft runs in a supported manner in the operating state, incurs damage which can lead to a deterioration in the bearing, in particular the lubrication so that in the worst-case scenario damage may occur to the bearing which can lead to further serious damage to the corresponding engine.

DE 100 35 032 A1 discloses a method having the features of the preamble of the independent method Claim. In this known method, the bearing cover is separated from the rest of the connecting rod by break-separation. In order to be able to effect the break-separation, an incipient break groove is provided in the large connecting rod eye and defines an intended break point for the break-separation. Furthermore, the inner wall of the large connecting rod eye is provided with a surface coating in this known method, in that a bearing layer is applied by means of a thermal spraying method. In order to provide a region of the inner wall of the large connecting rod eye without any surface coating, the technical teaching of DE 100 35 032 A1 proposes to set a separating surface elevation into the incipient break groove, which elevation then acts as a masking agent. The separating surface elevation set, on the root side, into the depression forming the incipient break groove thus forms a mask which shields a region directly surrounding the incipient break groove from the coating material so that a non-coated region is formed on the incipient break groove (cf. column 4, paragraph 0033). A disadvantage in this known method is that an incipient break groove in the connecting rod eye is required in each case in order to be able to fixedly position the separating surface elevation with respect to the connecting rod eye. Without an incipient break groove, the mask known from DE 100 35 032 A1 cannot be used. A further disadvantage is that the removal of the masking agent, i.e., the separating surface elevation, after the coating process is cumbersome and is thus costly, since the fixed anchoring of the separating surface elevation in the incipient break groove must be removed for this purpose. Furthermore, this known mask by means of a separating surface elevation connected to the connecting rod eye is not suitable to be used successfully in industrial production methods in which high numbers of bearing components are produced in a manner which is as efficient and cost-effective as possible, since many bearing components are assembled together in the form of a stack and are simultaneously coated.

It is thus an object of the invention to provide an improved method for producing a bearing component, in particular a connecting rod, whose bearing seat surfaces are coated by means of a surface coating in the form of a bearing layer, so that there is no need to provide the disadvantageous bearing shells, wherein, however, the damaging effects known from the Prior Art on the bearing layer, caused for example by the break-separation, can be obviated.

It is a further object of the invention to provide a device by means of which high numbers of bearing components can be produced in a manner which is as efficient and cost-effective as possible.

The subject matter of the invention achieving these objects is characterised by the features of the independent Claim of the respective type.

The respective dependent Claims relate to particularly advantageous embodiments of the invention.

The invention thus relates to a method for producing a bearing component, in particular a connecting rod, from a moulded part, wherein the bearing component includes at least one divided bearing seat formed by a bearing base and a bearing cover, and a bearing seat surface coated with a bearing layer of a bearing layer material is formed in the bearing seat for supporting a shaft. In the method of the present invention, the bearing cover is separated from the moulded part along a separating surface. In accordance with the invention, a masking agent is disposed perpendicularly with respect to a separating line on the bearing seat surface during a coating process for applying the bearing layer in order to form a coating-free region, such that a recess is produced at a predetermined width in the bearing layer.

Consequently, an important feature of the invention is that the bearing layer, which can be for example a thermal spray coating applied by means of plasma spraying onto the bearing seat surface, is not separated by means of break-separation in the region of the separating surface. This is achieved by virtue of the fact that during the coating of the bearing seat surface in a region perpendicular to the separating line a masking agent is disposed on the bearing seat surface such that in the bearing layer a recess, preferably a strip-like recess, is produced over the entire width of the bearing component, i.e., for example over the entire thickness of the connecting rod eye during the coating process so that in the region in which the bearing cover is separated from the rest of the bearing component at a separating surface, e.g., by means of break-separation or another separating method, there is no surface coating in the form of the bearing layer so that the bearing layer which otherwise covers the rest of the bearing seat surface is in no way negatively influenced by the separation of the bearing cover from the rest of the bearing component, i.e., from the bearing base.

Thus, in accordance with the invention, a discontinuous bearing layer is produced in which in the region e.g., of an intended break point a mask is applied during the coating phase by means of which the application of the coating onto the surface of the connecting rod eye is locally prevented.

Thus, for the first time, a method for producing a bearing component is available which allows for the production e.g., of a connecting rod having a bearing layer on the bearing seat surface so that on the one hand there is no need to provide bearing shells, even in the case of large loads in the operating state the connecting rod cap is not displaced and thus it is reliably ensured that the bearing halves are correctly seated since the bearing component is itself separated along a separating surface, preferably by means of break-separation, and on the other hand the damaging effects on the bearing layer caused by the separation of the bearing cover from the bearing base, i.e., by the separation of the bearing cover from the rest of the bearing component, are obviated.

In a preferred exemplified embodiment of a method in accordance with the invention, the masking agent is formed in the form of a masking rod, in particular in the form of a masking rod having a round or an oval or a polygonal cross-section, in particular having a rectangular or square cross-section, wherein for coating purposes, in particular on an industrial scale, at least two bearing components, preferably ten or more bearing components, are disposed in the form of a stack on a retainer and/or the masking agent is anchored in the retainer.

This means that, above all in industrial production where high numbers of bearing components have to be produced in a manner which is as efficient and cost-effective as possible, several bearing components are disposed in the form of a stack on a retainer for coating purposes and can thus be coated for example simultaneously, wherein the retainer includes for example two masking rods which are disposed on the bearing seat surface in such a manner that perpendicularly with respect to the separating line in each bearing component two recesses are produced during the coating process so that during subsequent break-separation, the separating surfaces do not extend through the bearing layer and the bearing layer is therefore also not negatively influenced by the break-separation.

A device in accordance with the invention can include a plurality of bearing components disposed in the form of a stack can be coated in an efficient and cost-effective manner.

It will be understood that in very specific cases, a solid and/or liquid and/or gel-like material can also be provided as the masking agent perpendicularly with respect to the separating line on the bearing seat surface before the start of the coating process so that during the coating process adhesion of the bearing layer to the bearing seat surface in the region of the recess to be formed is prevented.

After coating the bearing seat surface with the bearing layer, the masking agent is removed and/or the bearing layer is preferably further processed at one edge of the recess in order to remove, smoothen or straighten any possible break-edges which can occur owing to removal of the masking agent in an edge region of the recess on the bearing layer.

As already mentioned, the bearing cover is preferably separated from the moulded part by means of break-separation. However, reference is explicitly made to the fact that the separation can also be effected by means of other methods, e.g., sawing, in specific cases, e.g., when it is ensured that the bearing cover is securely seated on the bearing base owing to other technical features or conditions. Even in such cases, the method in accordance with the invention has proven to be clearly superior since when sawing through the bearing layer, this layer is also subjected to considerable mechanical loads which can likewise lead to the above described damage to the bearing layer.

The moulded part is preferably provided with an incipient break groove in the recess to form the separating surface. The incipient break groove can be incorporated into the bearing seat surface in the region of the separating line e.g., by means of a thermo-chemical process, i.e., by means of an energy beam for example, such as a laser beam or an electron beam, or even by means of a mechanical process e.g., by means of a fluidic stream, preferably by means of a water stream or a mechanical groove device, or in specific cases even by means of the masking agent itself which can be provided with a groove means e.g., a cutting edge, to form the incipient break groove for example. As a result, the separating surface to be formed is characterised by the form of an intended break point so that a precise and clean separating surface is achieved e.g., in the case of subsequent break-separation.

In very specific cases, it is possible for the bearing cover to be separated prior to coating the bearing seat surface with the bearing layer. In other words, prior to coating the bearing seat surface with the bearing layer, the bearing cover is separated from the moulded part, in particular by means of break-separation and is then releasably re-assembled. Only then is the bearing seat surface coated with the bearing layer, wherein of course even in these cases the masking agent is used during the coating process to form the recess as described above.

The bearing layer is preferably applied by means of a thermal spraying method, in particular by means of flame spraying, high-velocity flame spraying, plasma spraying or any other thermal spraying method well known in the Prior Art, or by means of a galvanic method or by means of any other suitable coating method.

The moulded part, from which the bearing component is formed, is for its part produced in a manner known per se by casting, forging or a powder-metallurgical method, in particular by sintering or sinter-forging.

The bearing layer, for its part, can be formed e.g., as a sliding layer, in particular as a sliding layer having good dry and/or wet sliding properties as a sliding bearing layer.

The invention provides a bearing component, in particular a connecting rod, from a moulded part, wherein the bearing component includes at least one bearing seat which is divided at a separating surface and is formed by a bearing base and a bearing cover, and a bearing seat surface coated with a bearing layer composed of a bearing layer material is formed in the bearing seat to support a shaft. In accordance with the invention, a recess is provided at a predetermined width in the bearing layer to form a coating-free region perpendicularly with respect to a separating line, as already described in detail above in the discussion of the method in accordance with the invention.

In an exemplified embodiment which is very important in practice, the bearing component is formed as a connecting rod having a divided connecting rod head.

In the device in accordance with the invention, a retainer is provided on which at least two, preferably ten or more, bearing components are disposed in the form of a stack. In this manner, the bearing components can all be coated simultaneously in one working step. Since the masking agent is formed as an element (e.g., as a masking rod) which is separate from the bearing component and not connected thereto, the masking agent can be removed in a simple, cost-effective manner after the coating process and the masked, non-coated point can be exposed.

The invention will be described in more detail hereinafter with the aid of the schematic drawing, in which FIG. 1 shows a connecting rod produced by means of the method in accordance with the invention;

Figure 1:
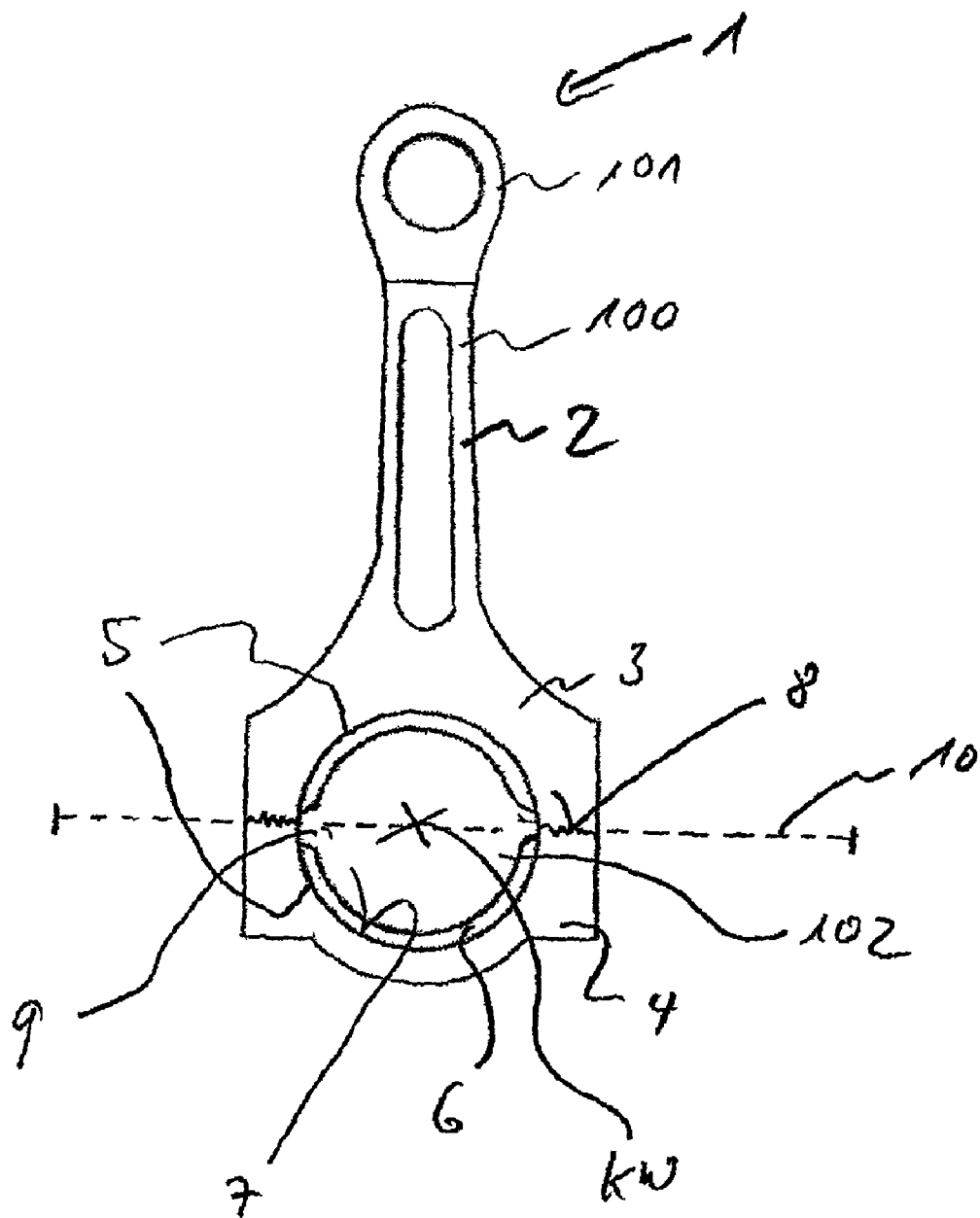

A connecting rod produced by means of the method in accordance with the invention is schematically illustrated in FIG. 1 and is designated hereinafter as a whole by the reference numeral 1.

The connecting rod of FIG. 1 was produced from a moulded part 2 for example in a sintering or forging method. The connecting rod 1 includes a bearing base 3 which is connecting to a small connecting rod eye 101 via a connecting rod shaft 100 in a manner known per se. Together with the bearing cover 4, the bearing base 3 forms a divided bearing seat 5, wherein a bearing seat surface 7 coated with a bearing layer 6 composed of a bearing layer material is formed in the bearing seat 5 to support a crankshaft KW.

The divided bearing seat 5 has been separated at a separating surface 8 by means of break-separation. In the assembled state, the bearing cover 4 is screwed to the bearing base 3, i.e., to the rest of the connecting rod 1 e.g., by means of connecting rod screws which are not illustrated in FIG. 1 for reasons of clarity.

The recess 9 can be clearly seen and extends in the form of a coating-free strip perpendicularly with respect to the separating line 10 over the entire thickness D of the connecting rod 1, i.e., in the direction of an axis of the crankshaft KW. In accordance with the invention, the recess 9 was already produced using the masking agent M during the coating of the bearing seat surface 7 with the bearing layer 6 prior to the break-separation of the large connecting rod eye 102, which is formed by the bearing base 3 and the bearing cover 4. For this purpose, the masking agent M is disposed on the bearing seat surface 7, during the coating process to apply the bearing layer 6, perpendicularly with respect to the separating line 10 such that the coating-free recess 9 in the form of a strip having width B is produced in the bearing layer 6. As a result, the bearing layer 6 does not have any damage whatsoever owing to the subsequent break-separation process. In particular, the bearing layer 6 does not have any inner stresses caused by the break-separation, optimally adheres overall to the bearing seat surface 7 and also the surface of the bearing layer 6, which forms a running surface for the corresponding crankshaft section, does not have any damage whatsoever, as can occur in the Prior Art, and is in a flawless state in every respect. In other words, by virtue of the fact that the recess 9 has already been produced during the coating process prior to the break-separation, during subsequent separation of the bearing cover 4 from the bearing base 3 no damaging effects whatsoever are caused, such as inner stresses, plastic or non-plastic deformation, eruptions on the inner edges of the bearing layer, etc.

Figure 2:
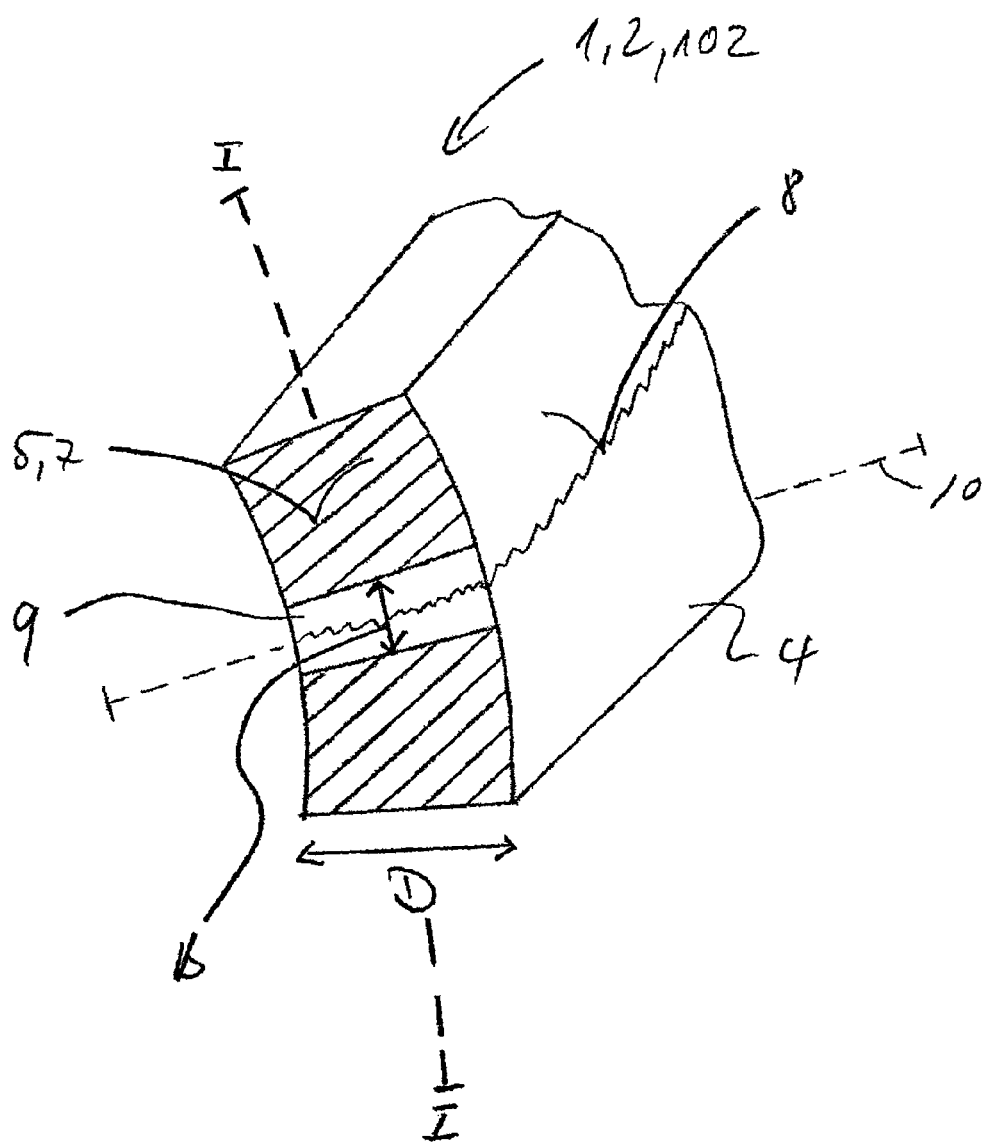
FIG. 2 shows a perspective illustration of the recess in the connecting rod eye of the connecting rod of FIG. 1.

FIG. 2 shows a perspective illustration of the recess in the large connecting rod eye 102 of the connecting rod 1 of FIG. 1 in a detailed sectional view, again for reasons of clarity.

The bearing cover 4 was separated along the separating surface 8 after the recess 9 was produced during the coating process using the masking agent M, said recess having a width B which can be for example between 1 mm and 3 mm, particularly 2 mm and extends perpendicularly with respect to the separating line 10 over the thickness D of the connecting rod eye 102, and the bearing cover 4 was then re-mounted. It can be clearly seen that owing to the break-separation a separating surface 8 having a unique, irregular structure is formed so that the bearing cover 4 and the bearing base 3 uniquely fit together, whereby on the one hand it is ensured that the bearing cover 4 is securely seated on the rest of the connecting rod 1 and on the other hand the parts cannot be mixed-up during assembly.

Figure 3:
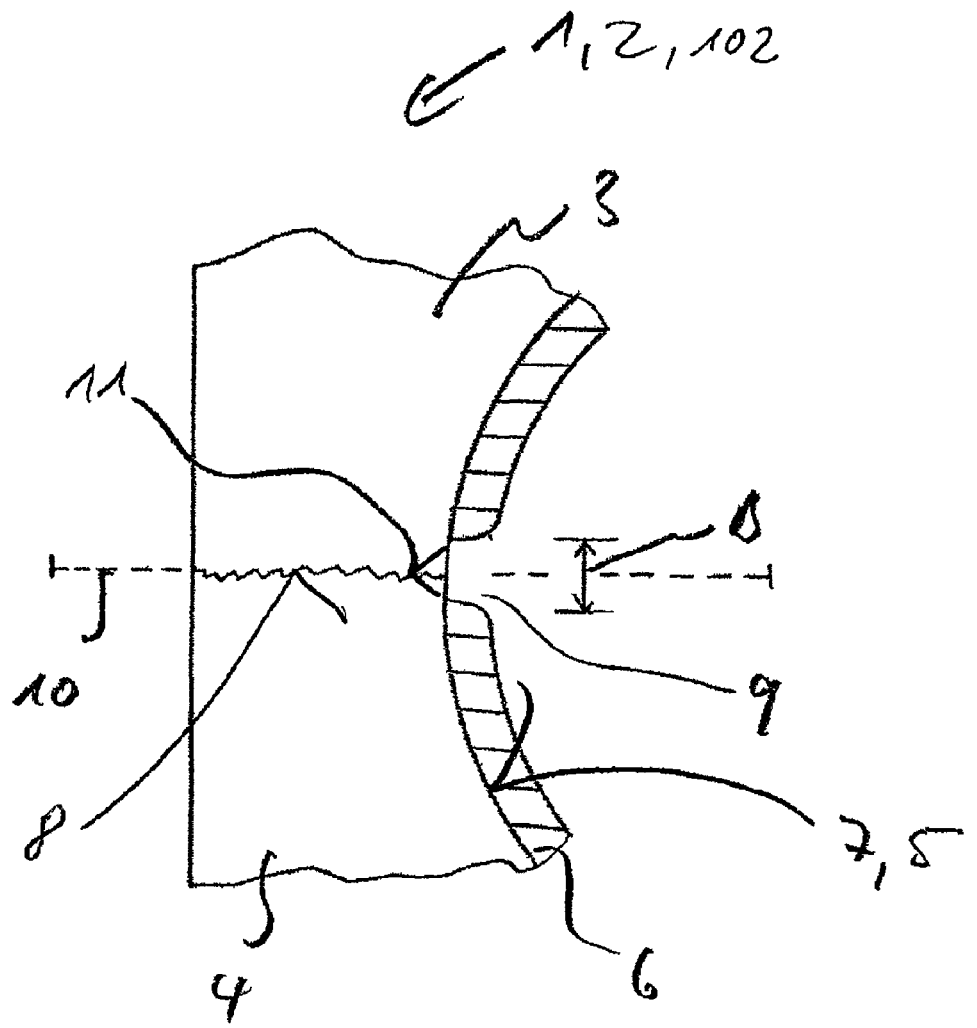
FIG. 3 shows a sectional view along the sectional line I-I of FIG. 1 prior to the break-separation.

FIG. 3 shows a sectional view along the sectional line I-I of FIG. 2 prior to break-separation. The bearing cover 4 and the bearing base 3 thus still form a single unit, the separating surface 8 which is probably to be expected in the case of a subsequent break-separation is already schematically pre-sketched. The bearing seat surface 7 is coated with the bearing layer 6, wherein by using the masking agent M during the coating of the bearing seat surface 7 with the bearing layer 6, the recess 9 of width B was produced in the bearing layer 6 in the form of a coating-free region perpendicular to the separating line 10. An incipient break groove 11 is provided in the recess 9 and is to permit the subsequent break-separation, in that it defines an intended break point to form the separating surface 8.

Figure 4:
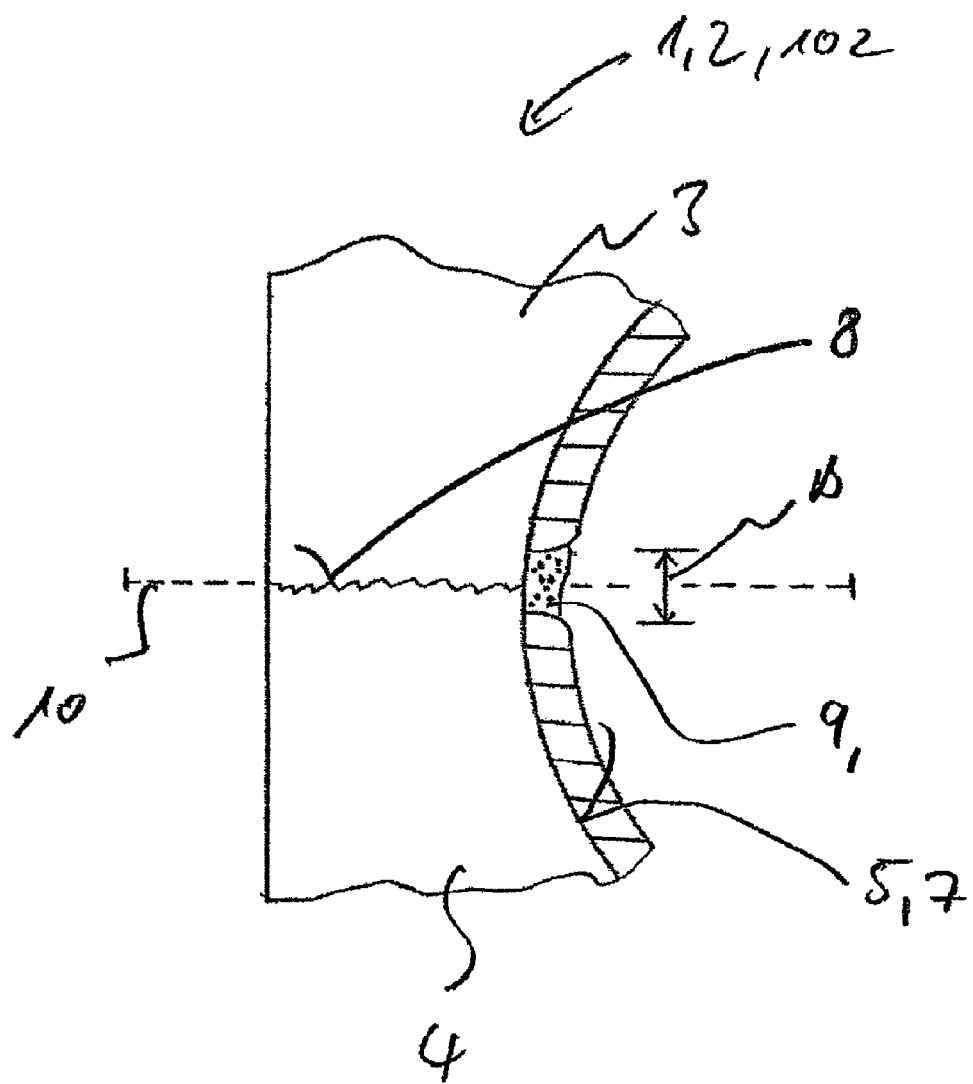
FIG. 4 shows the section of the connecting rod of FIG. 3 in the operating state.

Finally, FIG. 4 schematically illustrates the section of the connecting rod 1 of FIG. 3 in the operating state. The connecting rod 1 is in the installation state and supports a crankshaft KW which is not illustrated in more detail in FIG. 4 for reasons of clarity.

A mixture of lubricating oil and dirt collects in the recess 9 of width B and is formed in operation of e.g., oil and wear debris, in particular of metallic wear debris. The wear debris is taken up by the lubricating oil and transported into the recesses 9.

A further important advantage of the recess 9 in the bearing layer 6 can thus be seen very clearly in FIG. 4. The recess 9 is namely used on the one hand as an oil pocket in which a certain amount of lubricating oil can be stored so that the lubrication between the bearing layer 6 and the supported crankshaft KW is improved. On the other hand, since the lubricating oil which is stored in the recess 9 receives the dirt and wear debris particles accrued during operation, these are removed from the oil film which is used as a lubricating film between the bearing layer 6 and the crankshaft KW so that the lubricating effect of the oil film is clearly improved.

Figure 5:
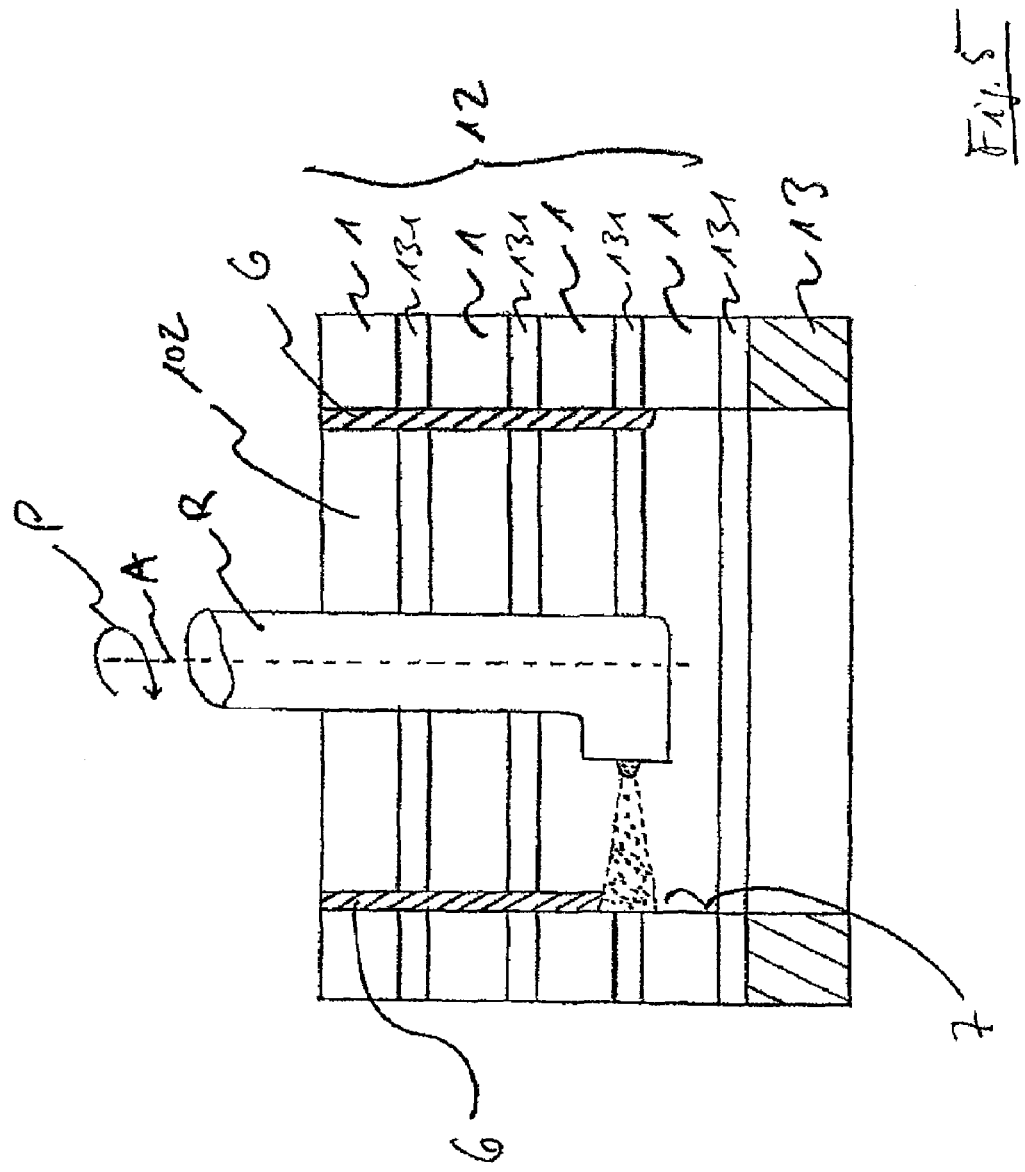
FIG. 5 shows a stack of bearing components during a coating process by means of thermal spraying.
Figure 6:
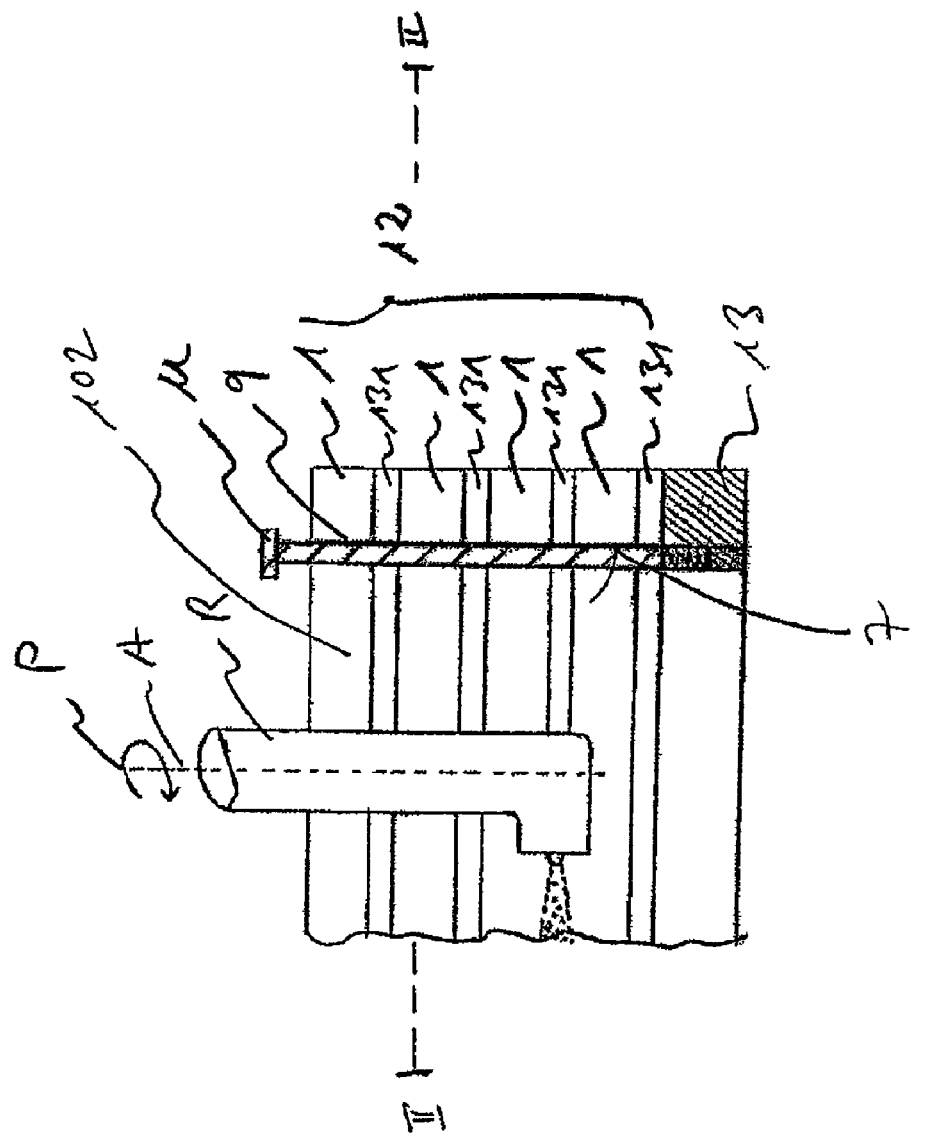
FIG. 6 shows an illustration of the stack of FIG. 5, rotated through 90°, having masking rods.
Figure 7:
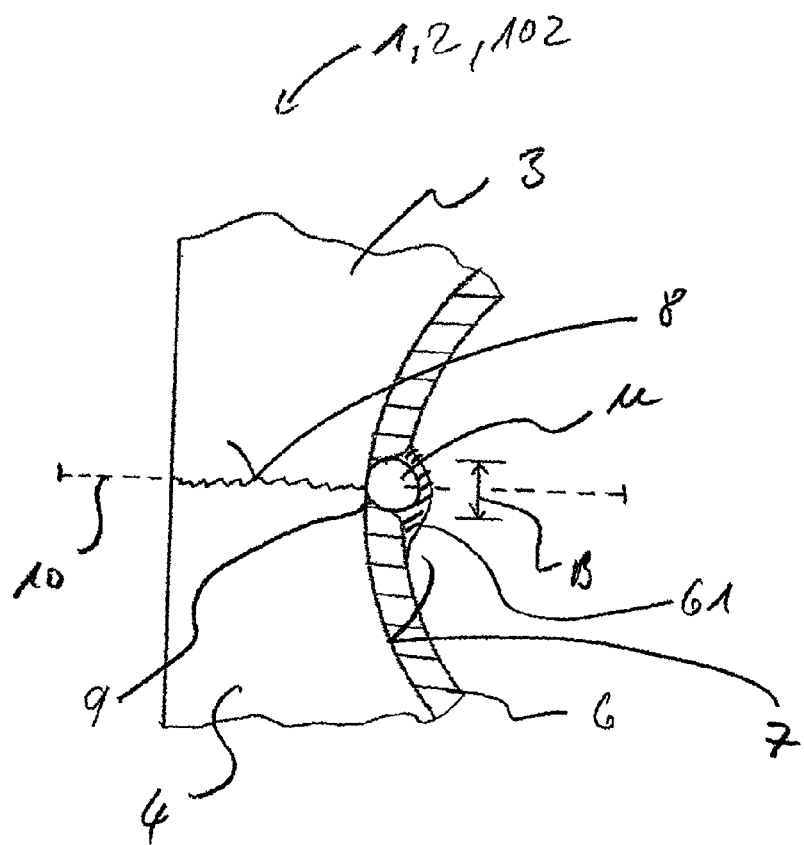
FIG. 7 shows a sectional view along the sectional line II-II of FIG. 6.

Finally, a preferred method or device for coating a bearing component 1 in accordance with a method of the invention are schematically illustrated in FIGS. 5 to 7.

In the example of FIG. 5, a total of four bearing components 1, e.g., four connecting rods 1, are stacked together one above the other in the form of a stack 12 on a retainer 13 such that all the bearing seat surfaces 7 of all four bearing components 1 can be simultaneously coated using the rotating plasma spraying device R which is known per se from the Prior Art.

The plasma spraying device R rotates during the coating process about the axis A, as illustrated by the arrow P, and is guided, as per the illustration, in the perpendicular direction along the axis A so that all of the bearing seat surfaces 7 in all of the large connecting rod eyes 102 of all of the bearing components 1 can be coated with a bearing layer 6 one after the other by a thermal plasma spraying method.

In each case, a masking agent M, which in the present example is a masking rod M, is provided on every two opposite-lying zones of the bearing seat surfaces, in each of which zones a coating-free strip is to be produced to form two opposite-lying recesses 9. In the sectional illustration of FIG. 5, the masking rods M are not illustrated since they are located in two zones of the bearing seat surfaces 7 located perpendicularly with respect to the plane of the drawing.

Since, after the coating process has been completed, the bearing parts 4 are cleanly separated in a damage-free manner, an intermediate disc 131, which e.g., can have a thickness of about 2 mm, is still provided between every two bearing components 1.

FIG. 6 illustrates a view of the stack 12 of FIG. 5 rotated through 90° about the axis A, so that in this Figure the masking rods M can also be seen. For reasons of clarity, only the right side—as per the drawing—of the stack 12 is shown. As already mentioned, a masking rod M is provided in each case on two opposite-lying zones of the bearing seat surfaces, in each of which zones a coating-free strip is to be produced to form two opposite-lying recesses 9.

As can be clearly seen in FIG. 6, the masking rod M in all four of the large connecting rod eyes 102 simultaneously masks in each case a strip of width B so that no coating material which is sprayed onto the bearing seat surface by the rotating plasma spraying device R can pass onto the bearing seat surface 7 in the region of this strip so that the coating-free recess 9 is automatically formed.

The masking rods M are fixedly anchored in the retainer 13 by means of a screw connection so that they rest against the bearing seat surfaces 7 overall in the stack 12 such that no coating material is applied to the bearing seat surfaces 7 in the region of the masking rods M.

The person skilled in the art will comprehend that the masking rods can of course also be fixed to the bearing seat surface in any other suitable manner to mask the coating-free region to be formed. In order to increase the stability in particular, the masking rods M can also be additionally retained for example on the upper end of the stack or e.g., in each case in a bore in the intermediate discs 131 or by any other measures known to the person skilled in the art.

Finally, FIG. 7 shows a sectional view along the sectional line II-II of FIG. 6. The large connecting rod eye which is still in the stack 12 in accordance with FIG. 6, namely in a region which has already been coated by the rotating plasma spraying device R, has of course not yet been separated by break-separation. Only the expected course of the separating surface 8 is sketched, which will be produced during a subsequent break-separation of the bearing cover 4 from the bearing base 3.

It can be clearly seen how the masking rod M has masked a region of width B during the preceding coating process so that a coating-free region could be produced on the bearing seat surface 7 in the form of the recess 9 during the coating process. It can likewise be seen that during the coating process, of course, the masking rod M was also lined with a thin layer 61 of layer material. This thin layer 61 is automatically removed as the masking rod M is removed after the coating process has been completed so that only the coating-free recess 9 remains. Possibly, if required, after the masking rod M has been removed, the bearing layer 6 is further processed in the region of the edges of the recess 9 in order to remove, e.g., by polishing or smoothing, small amounts of damage on the edges for example, which can occur in rare cases when the masking rods M are removed.

It will be understood that the previously described exemplified embodiments of the invention can be combined in any suitable manner depending upon the use and the exemplified embodiments described in terms of this application are to be understood as being merely exemplary. The person skilled in the art will comprehend in particular that all suggested developments of the described exemplified embodiments are covered by the present invention.

The invention claimed is:

1. A method for producing a bearing component (1), from a moulded part (2), wherein the bearing component (1) includes at least one divided bearing seat (5) formed by a bearing base (3) and a bearing cover (4), wherein a bearing seat surface (7) coated with a bearing layer (6) of a bearing layer material is formed in the bearing seat (5) for supporting a shaft, the method comprising
   separating the bearing cover (4) from the moulded part (2) along a separating surface (8), wherein a masking agent (M) is disposed perpendicularly with respect to a separating line (10) on the bearing seat surface (7) during a coating process for applying the bearing layer (6) in order to form a coating-free region, such that the masking agent (M) prevents the coating of the bearing seat surface (7) with bearing layer material in the masked region during the coating process and after removing the masking agent (M) a recess (9) at a predetermined width (B) remains in the bearing layer (6), wherein the masking agent (M) is formed as an element which is separate from the bearing component (1), the masking agent is a masking rod and the masking agent is anchored in a retainer.

2. The method as claimed in claim 1, wherein the masking rod (M) has a round, or an oval or a polygonal cross-section.

3. The method as claimed in claim 1, wherein for coating purposes, at least two bearing components are disposed in the form of a stack (12) on the retainer.

4. The method as claimed in claim 1, wherein after coating the bearing seat surface (7) with the bearing layer (6), the masking agent (M) is removed and/or the bearing layer (6) is further processed at one edge of the recess (9).

5. The method as claimed in claim 1, wherein the bearing cover (4) is separated from the moulded part (2) by means of break-separation.

6. The method as claimed in claim 1, wherein the moulded part (2) is provided with an incipient break groove (11) in the recess (9) to form the separating surface (8).

7. The method as claimed in claim 1, wherein prior to coating the bearing seat surface (7) with the bearing layer (6), the bearing cover (4) is separated from the moulded part (2) and is then releasably re-mounted.

8. The method as claimed in claim 1, wherein the bearing layer (6) is applied by means of flame spraying, high-velocity flame spraying, plasma spraying or by means of a galvanic method.

9. The method as claimed in claim 1, wherein the moulded part (2) is produced by casting or forging or a powder-metallurgical method.

10. The method as claimed in claim 1, wherein the bearing layer (6) is formed as a sliding bearing layer.

11. A device for producing a bearing component from a moulded part (2), wherein the bearing component (1) includes at least one divided bearing seat (5) formed by a bearing base (3) and a bearing cover (4), wherein the device comprises a rotating coating device (R) by means of which a bearing seat surface (7) of the bearing seat (5) is coated with a bearing layer (6) of a bearing layer material, wherein a masking agent (M) is provided in order to form a coating-free region and is disposed perpendicularly with respect to a separating line (10) on the bearing seat surface (7) during the coating process for applying the bearing layer (6) such that the masking agent (M) prevents the coating of the bearing seat surface (7) with bearing layer material in the masked region during the coating process and after removing the masking agent (M) a recess (9) at a predetermined width (B) remains in the bearing layer (6), wherein a retainer (13) is provided on which at least two, bearing components (1) can be disposed in the form of a stack (12), wherein the masking agent (M) is formed as an element which is separate from the bearing component (1), the masking agent is a masking rod and the masking agent is anchored in the retainer.

12. The device as claimed in claim 11, wherein means are provided for fixing the masking agent (M).

13. The device as claimed in claim 11, wherein the masking agent (M) is additionally retained at the upper end of the stack or in a bore of an intermediate disc (131) disposed between the bearing components (1).

* * * * *